US 7,377,594 B2

(12) United States Patent
Erickson et al.

(10) Patent No.: US 7,377,594 B2
(45) Date of Patent: May 27, 2008

(54) CUTTING TOOL

(75) Inventors: Robert W. Erickson, Georgetown, TX (US); Jimmie L. Sollami, Herron, IL (US)

(73) Assignee: River City Manufacturing, Inc., Austin, TX (US)

( * ) Notice: Subject to any disclaimer, the term of this patent is extended or adjusted under 35 U.S.C. 154(b) by 149 days.

(21) Appl. No.: 11/150,509

(22) Filed: Jun. 10, 2005

(65) Prior Publication Data

US 2006/0290198 A1    Dec. 28, 2006

(51) Int. Cl.
*E21C 35/183*    (2006.01)
(52) U.S. Cl. ..................................... 299/106
(58) Field of Classification Search ........ 299/102–107, 299/110–111, 113
See application file for complete search history.

(56) References Cited

U.S. PATENT DOCUMENTS 4,502,734 A * 3/1985 Allan .................. 299/101
5,078,219 A * 1/1992 Morrell et al. ............ 299/111
5,333,938 A    8/1994 Gale
5,456,522 A    10/1995 Beach
5,478,175 A * 12/1995 Kraemer ..................... 407/7
6,102,486 A * 8/2000 Briese ..................... 299/111

FOREIGN PATENT DOCUMENTS

RU            2132949 C1 * 7/1999

* cited by examiner

*Primary Examiner*—Sunil Singh
(74) *Attorney, Agent, or Firm*—James Ray & Assoc.

(57) ABSTRACT

A cutting tool for use on earth working and land clearing equipment includes a working body portion having a cavity disposed therein which begins at a peripheral edge of a first end and extends inwardly towards a second end of such working body portion. The cavity is provided with a cutting portion disposed at an acute angle about such peripheral edge. A mounting shank extends outwardly from and is attached to the second end of the working body portion for enabling attachment of the cutting tool to a tool holder used on such earth working and land clearing equipment. At least one pin member engaging the complimentarily aligned grooves within an aperture of the tool holder and an outer surface of the shank portion is used to securely retain the cutting tool within the tool holder.

12 Claims, 2 Drawing Sheets

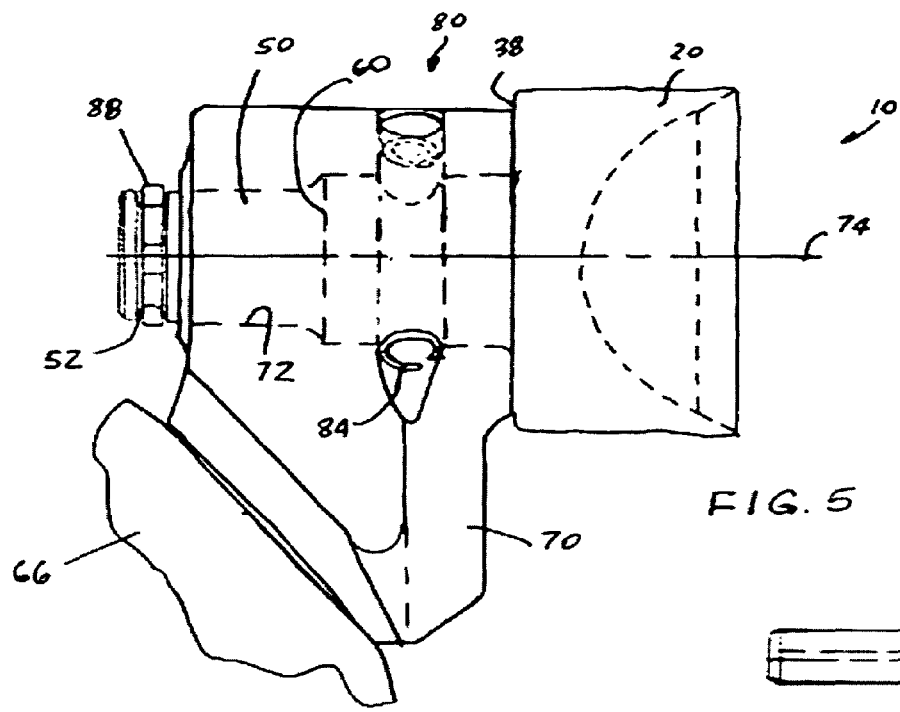
FIG. 5
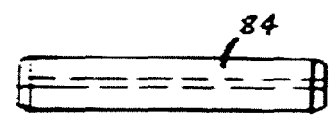
FIG. 8
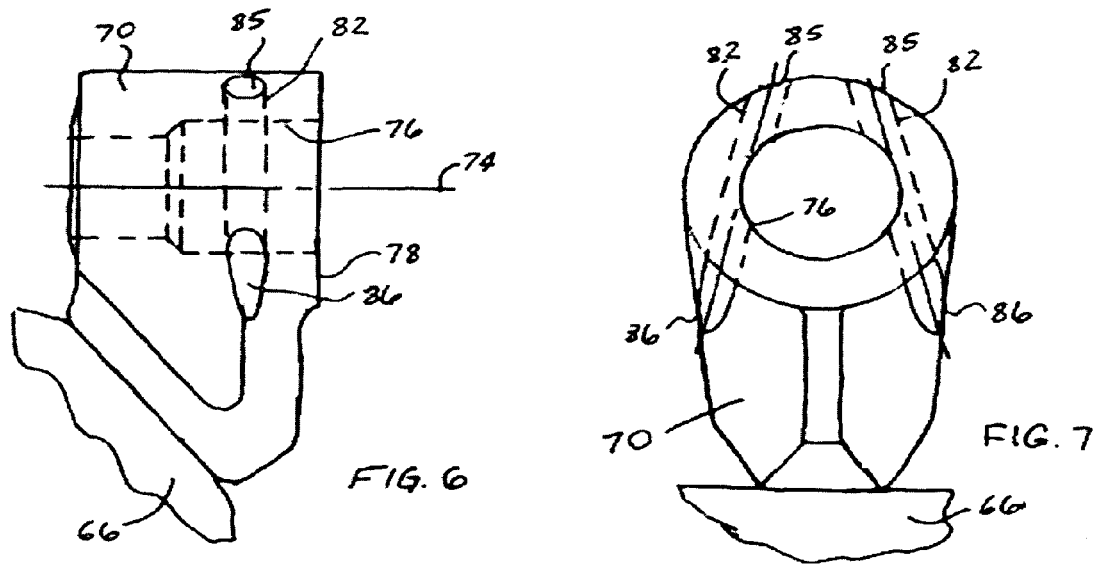
FIG. 6
FIG. 7

CUTTING TOOL

CROSS-REFERENCE TO RELATED APPLICATIONS

This application is closely related to U.S. Utility patent application Ser. No. 10/733,607 filed on Dec. 11, 2003, now abandoned, to U.S. Utility patent application Ser. No. 11/067,439 filed on Feb. 25, 2005, now U.S. Pat. No. 7,082,743, to co-pending U.S. Ser. No. 11/150,508 entitled "Retaining System For Securing A Cutting Tool To A Support Block", filed concurrently herewith. These applications being assigned to the assignee of the present invention and the disclosures of these applications are hereby incorporated by reference thereto.

FIELD OF THE INVENTION

The present invention relates, in general, to cutting tools and, more particularly, this invention relates to cutting tools for use on earth working and land clearing equipment.

BACKGROUND OF THE INVENTION

As is generally well known, one style of cutting tool for use on earth working and land clearing equipment includes a conical pointed working end and an axially extending shank portion for securely mounting such cutting tools within an aperture of a tool holder which is welded to a chain attachment or a rotatable drum of such earth working and land clearing equipment.

Contact of the working end with material to be cleared or removed generally shatters such material and produces small pieces or shredded remnants that can be easily removed or left on the ground surface for natural decomposition. The shank portion of such pointed cutting tool is secured to the support block either with external retaining clips engaging the rear surface of such tool holder or with retaining pins engaging a groove formed within the aperture and a complimentary groove formed in the shank portion. The use of internally disposed retaining pins facilitates ease of replacement of such cutting tool during use. Furthermore, a rotatable attachment of the cutting tool is preferred for extending its life by utilizing the entire cutting surface.

Another style of cutting tool presently used includes a shallow concave cutting surface formed within a working end typically having a larger diameter. U.S. Pat. No. 5,078,219 issued to Morrell et al teaches one type of such concave cutting tool for a non-percussive excavation machine wherein the concave cutting surface is part of an insert which is attached to the shank portion either by mechanical means or by brazing. Additionally, the shank portion is secured to the support block with external retaining clips.

U.S. Pat. No. 5,333,938 issued to Gale illustrates the insert having a concave cutting surface with an axially disposed hollow bearing and which is attached with a fastener extending through such hollow bearing into the support block.

U.S. Pat. No. 5,456,522 issued to Beach teaches a rotatable cutting tool wherein the concave cutting surface is formed by a plurality of carbide inserts brazed to the cutting tool body and wherein the shank portion is secured to the support block with external retaining clips.

It has been found that in applications of clearing land having lush vegetation with small diameter trees and brush and where disturbance of the ground surface is prohibited, the cutting tools with the pointed working end were bending such vegetation and were leaving remnants of six inches and longer sticking from the ground surface. Such situation is undesirable, as it requires additional clearing effort to reuse the land.

The disadvantage of presently available cutting tools with concave cutting surface is an increased cost due to the design of such cutting tools and due to their replacement effort during use.

Therefore, there is a need for an improved cutting tool that is better suitable for economical clearing of lush vegetation in close proximity to the ground surface.

SUMMARY OF THE INVENTION

The invention provides a cutting tool for use on earth working and land clearing equipment. The cutting tool includes a working body portion having a cavity disposed therein which begins at a peripheral edge of a first end and extends inwardly towards a second end of such working body portion. The cavity is provided with a cutting portion disposed at an acute angle about such peripheral edge. Such acute angle promotes slicing action and enables clearing of small trees, brush and lush vegetation in close proximity to a ground surface. The cutting portion is cold treated to increase the strength of the cutting tool and improve its usable working life. Alternatively, the cutting portion may be formed by using at least one insert secured within a flange provided within the cavity. A mounting shank portion extends outwardly from and is attached to the second end of the working body portion for enabling attachment of the cutting tool to a tool holder used on such earth working and land clearing equipment. The shank portion formed integral to the working body portion, preferably by an economical forging process, and is configured for insertion into an aperture provided within the tool holder. At least one pin member engaging the complimentarily aligned grove within the aperture of the tool holder and an outer surface of the shank portion is used to rotatably secure the cutting tool within the tool holder. Alternatively, the shank portion may be configured as a flange having at least one aperture for mechanical fastening of the cutting tool to the tool support.

OBJECTS OF THE INVENTION

It is, therefore, one of the primary objects of the present invention to provide an improved cutting tool for use on earth working and land clearing equipment.

Another object of the present invention is to provide a cutting tool for use on earth working and land clearing equipment that improves clearing of lush vegetation and small diameter trees and shrubs in close proximity to a ground surface.

Yet another object of the present invention is to provide a cutting tool for use on earth working and land clearing equipment that is economical to manufacture.

A further object of the present invention is to provide a cutting tool for use on earth working and land clearing equipment that allows its easy removal from the tool holder.

Yet a further object of the present invention is to provide a cutting tool for use on earth working and land clearing equipment that requires simple tools for its removal from the tool holder.

An additional object of the present invention is to provide a cutting tool in combination with the tool holder for use on earth working and land clearing equipment that promotes a slicing action during use.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 5 is a side view of a cutting tool mounted in a support block in accordance with a presently preferred embodiment of the invention;

FIG. 6 is a side view of a support block in accordance with a presently preferred embodiment of the invention;

FIG. 7 is a front view of the support block of FIG. 6;

FIG. 8 is a side view of a pin member as used in a presently preferred embodiment of the invention.

BRIEF DESCRIPTION OF THE VARIOUS EMBODIMENTS OF THE INVENTION

Figure 1:
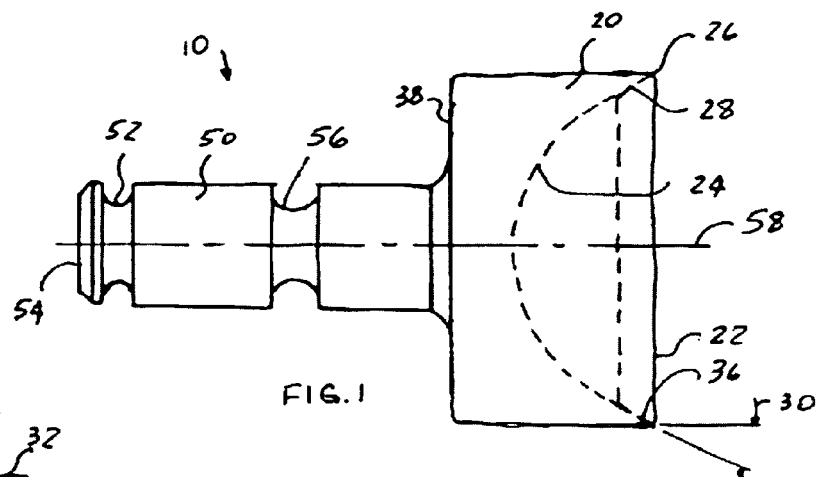
FIG. 1 is a side view of a cutting tool according to one embodiment of the invention.

Prior to proceeding to the more detailed description of the present invention, it should be noted that, for the sake of clarity and understanding, identical components which have identical functions have been identified with identical reference numerals throughout the several views illustrated in the drawing figures.

Reference is now made, to FIGS. 1-9, wherein there is shown a cutting tool, generally designated 10, for use on earth working and land clearing equipment (not shown). The cutting tool 10 includes a working body portion 20 having a predetermined shape and a predetermined size and having a first end 22 and a second end 38 spaced from the first end 22.

A cavity 24 having a predetermined shape is disposed in the working body portion 20 beginning at a peripheral edge 26 of the first end 22 and extending inwardly toward the second end 38. Preferably, a cutting portion 28, having a predetermined width, is formed within such cavity 24 adjacent such peripheral edge 26 and is oriented at a predetermined angle 30 about the peripheral edge 26, as best shown in FIG. 1. In a presently preferred embodiment of the invention, such predetermined angle 30 is about 30 degrees. Alternatively, such cutting portion 28 may be formed on an outer surface of the working body portion 20 adjacent the peripheral edge 26.

Furthermore, in the presently preferred embodiment of the invention, cutting tool 10 is manufactured from high strength steel by a forging process and the cutting portion 28 is formed by machining after such forging process. It will be understood that the forging process provides for a cost effective cutting tool 10. The outer surface of the working body portion 20 may be sloped intermediate each end thereof to reduce weight of the cutting tool 10 and further reduce its cost.

Figure 2:
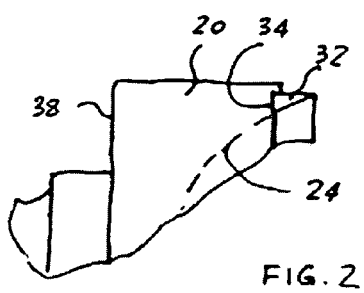
FIG. 2 is a partial side view of a cutting tool of FIG. 1, particularly showing an alternative cutting insert.

Alternatively, as best shown in FIG. 2, the cutting portion 28 and the peripheral edge 26 may be formed by at least one insert 32 secured within a flange 34 formed within the cavity 24. The material for such at least one insert 32 is selected from a group consisting of tungsten carbide, diamond coated tungsten carbide, ceramic and various combinations thereof.

To improve the usable working life of the cutting tool 10 and reduce its replacement costs, at least cutting portion 28 is cold treated after the machining process to further increase its strength. Alternatively, a coating 36, selected from a group consisting of tungsten carbide, diamond, ceramic and various combinations thereof, may be deposited at least onto the cutting portion 28.

Figure 3:
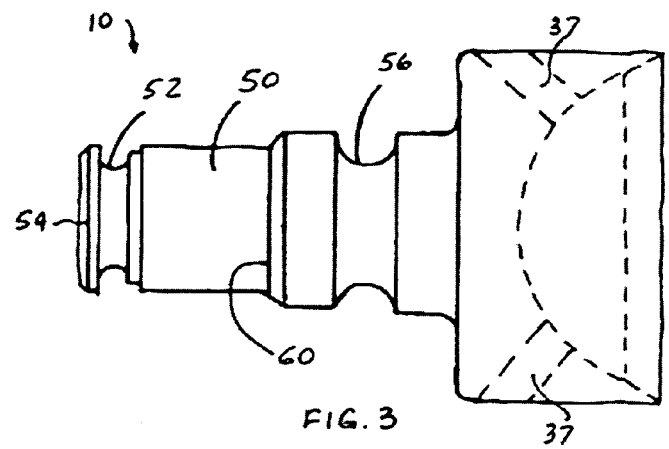
FIG. 3 is a side view of a support block in accordance with a presently preferred embodiment of the invention.

At least one passageway 37 connecting the cavity 24 with an outer surface of the working body portion 20, as best shown in FIG. 3, may be provided for facilitating removal of the material from the cavity 24 during operation.

Figure 4:
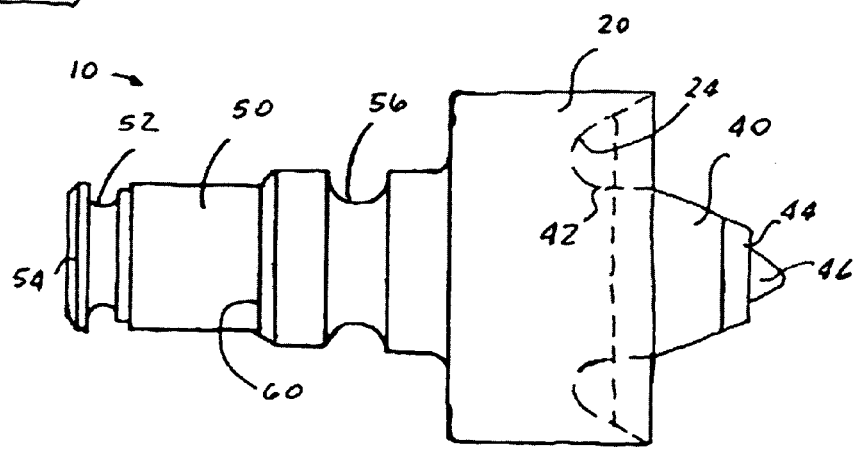
FIG. 4 is a side view of a cutting tool according to another embodiment of the invention.

In particular reference to FIG. 4, cutting tool 10 may further include a second working body portion 40 connected to and extending outwardly from a bottom surface of the cavity 24 for a predetermined length. Such second working body portion 40 is defined by a substantially tapered configuration reducing in size from a lower end 42 to an upper end 44. The upper end 44 may be configured to receive an insert 46. Preferably, the working body portion 20 and the second working body portion 40 are formed as an integral single piece unit.

In further reference to FIG. 1, cutting tool 10 includes a mounting means 50 having a predetermined shape and extending outwardly from and attached to the second end 38 of the working body portion 20 for enabling attachment of the cutting tool 10 to such at least one of such earth working and land clearing equipment (not shown). Preferably, working body portion 20 and mounting means 50 are formed as an integral single piece unit.

In the presently preferred embodiment, the mounting means 50 is configured as a shank portion 50 having each of a predetermined shape and a predetermined length. Such shank portion 50 includes a circumferential groove 52 formed in an outer surface of the shank portion 50, closely adjacent distal end 54. The shank portion 50 may further include a groove 56, having a predetermined shape, formed in an outer surface of the shank portion 50 intermediate each end thereof, the groove 56 is formed in a direction transverse to a longitudinal axis 58 of shank portion 50. In the most presently preferred embodiment, shank portion 50 further includes at least one ledge portion 60 formed on an outer surface of the shank portion 50 intermediate each end thereof. The preferred shape of the shank portion 50 is round.

It will be appreciated that the shank portion 50 of the presently preferred embodiment is configured for rotatable engagement within an aperture 72 of a tool holder 70, best shown in FIGS. 5-7. In operation, such tool holder 70 is secured to a predetermined portion 66 of such at least one of such earth working and such land clearing equipment (not shown), in a manner resulting in a longitudinal axis 74 of such aperture 72 being disposed in a predetermined direction and at a predetermined angle about the ground surface (not shown).

Advantageously, the second end 38 of the working body portion 20 is made larger than the shank portion 50 enabling such second end 38 to radially extend past the aperture 72 adjacent the face surface 78 of the tool holder 70 and to minimize entry of the undesirable earth and other particles into the aperture 72 which, as is well known, impedes rotation of the shank portion 50 and accelerates wear thereof. The second end 38 further acts as a bearing surface between the cutting tool 10 and the tool holder 70 thus protecting its face surface 78.

Means, generally designated 80, engageable with each of the cutting tool 10 and the tool holder 70, is provided for securely retaining the cutting tool 10 within the tool holder 70. Such retaining means 80 includes the aforementioned groove 56 and a second groove 82, having a predetermined shape, formed in a surface 76 of the aperture 72, wherein the groove 56 formed in the outer surface of the shank portion 50 is substantially radially opposed to the second groove 82 when the shank portion 50 is inserted into the aperture 72. The groove 82 corresponds with a pair of apertures 85 and 86 formed on an outer surface of the tool support 70 adjacent the aperture 72. At least one pin member 84, best shown in FIG. 8, engaging each of the groove 56 and the second groove 82 is provided for securing the cutting tool 10 in the tool holder 70.

Preferably, there are a pair of grooves 82 and a pair of pin members 84 provided for securing the cutting tool 10. A retaining clip 88 engaging the circumferential groove 52 may be further employed to secure the cutting tool 10 in the tool holder 70. While such embodiment, taught by co-pending U.S. Ser. No. 11/150,508 entitled "Retaining System For Securing A Cutting Tool To A Support Block" is illustrated, it will be understood that other conventional retaining means may be applied to secure shank portion 50 within the tool holder 70 in one of a rotatable and a non-rototable condition.

Figure 9:
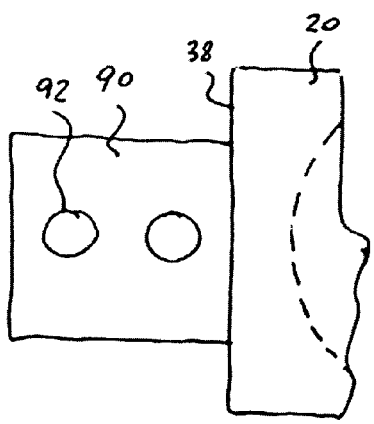
FIG. 9 is a partial side view of a cutting tool of the present invention, particularly showing an alternative mounting flange.

In the alternative embodiment of the present invention, best shown in FIG. 9, the mounting means 50 of the cutting tool 10 is configured as a flange 90 extending from and attached to the second end 38 of the working body portion 20 and includes at least one aperture 92 for fastening the cutting tool 10 to the predetermined portion of such at least one of such earth working and land clearing equipment (not shown).

It is noted that, in operation, the cutting portion 28 oriented at an angle 30 of about 30 degrees and in combination with land clearing apparatus taught by U.S. Utility patent application Ser. No. 11/067,439 filed on Feb. 25, 2005, provide a knife-like cutting edge which promotes slicing action in clearing small diameter trees and shrubs and other lush vegetation. Such slicing action prevents bending of such small trees and shrubs and other lush vegetation and results in clearing them in close proximity to and without disturbance of the ground surface.

The cutting tool 10 of the present invention further produces fine sawdust-like particles rather than elongated remnants associated with use of a conventional pointed cutting tool.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A cutting tool for use on at least one of earth working and land clearing equipment, said cutting tool comprising:

(a) a working body portion having each of a predetermined shape and a predetermined size and having a first end and a second end spaced from said first end;

(b) a concave cavity disposed in said working body portion, said concave cavity having a peripheral edge thereof aligned with a peripheral edge of said first end and a base thereof extending inwardly towards said second end, said cavity having a frustum shaped flat continuous cutting portion formed therein and beginning at said peripheral edge thereof, said cutting portion having a a height thereof being smaller than a depth of said concave cavity, said cutting portion being slopped at a predetermined acute angle relative to a longitudinal axis of said cutting tool;

(c) a mounting means having a predetermined shape and extending outwardly from and attached to said second end of said working body portion for enabling attachment of said cutting tool to such at least one of such earth working and land clearing equipment; and (d) at least one passageway directly connecting a surface of said concave cavity intermediate said peripheral edge and said base thereof with an outer surface of said working body portion for facilitating removal of a material from said concave cavity during operation of said cutting tool.

2. The cutting tool, according to claim 1, wherein said cutting tool is a high strength steel and said cutting portion is formed by machining.

3. The cutting tool, according to claim 1, wherein said cutting tool includes means engageable with said cutting portion for improving a life of said cutting tool.

4. The cutting tool, according to claim 3, wherein said means includes cold treating at least said cutting portion.

5. The cutting tool, according to claim 3, wherein said means includes a coating deposited at least onto said cutting portion.

6. The cutting tool, according to claim 5, wherein said coating is selected from a group consisting of tungsten carbide, diamond, ceramic and various combinations thereof.

7. The cutting tool, according to claim 1, wherein said mounting means includes a shank portion having each of a predetermined shape and a predetermined length.

8. The cutting tool, according to claim 7, wherein said shank portion includes a circumferential groove formed in an outer surface thereof closely adjacent a distal end of said shank portion.

9. The cutting tool, according to claim 7, wherein said shank portion further includes a groove, having a predetermined shape, formed in an outer surface of said shank portion intermediate each end thereof, said groove being formed in a direction transverse to a longitudinal axis of said shank portion.

10. The cutting tool, according to claim 7, wherein said shank portion further includes at least one ledge portion formed on an outer surface of said shank portion intermediate each end thereof.

11. The cutting tool, according to claim 7, wherein said second end of said working body portion is larger than said shank portion.

12. The cutting tool, according to claim 1, wherein said predetermined acute angle is about 30 degrees.

* * * * *